(12) United States Patent
Yamaji et al.

(10) Patent No.: US 9,118,901 B2
(45) Date of Patent: *Aug. 25, 2015

(54) IMAGING APPARATUS, IMAGING METHOD AND IMAGING SYSTEM

(75) Inventors: Kei Yamaji, Tokyo (JP); Tetsuya Matsumoto, Tokyo (JP)

(73) Assignee: FUJIFILM CORPORATION, Tokyo (JP)

(*) Notice: Subject to any disclaimer, the term of this patent is extended or adjusted under 35 U.S.C. 154(b) by 531 days.

This patent is subject to a terminal disclaimer.

(21) Appl. No.: 13/402,259

(22) Filed: Feb. 22, 2012

(65) Prior Publication Data

US 2012/0236129 A1 Sep. 20, 2012

(30) Foreign Application Priority Data

Mar. 14, 2011 (JP) ................................ 2011-055498

(51) Int. Cl.
*H04N 13/02* (2006.01)
*H04N 5/232* (2006.01)
*H04N 13/00* (2006.01)

(52) U.S. Cl.
CPC ......... *H04N 13/021* (2013.01); *H04N 5/23219* (2013.01); *H04N 5/23296* (2013.01); *H04N 2013/0081* (2013.01)

(58) Field of Classification Search
None
See application file for complete search history.

(56) References Cited

U.S. PATENT DOCUMENTS

| 8,675,991 B2* | 3/2014 | Steinberg et al. ............. 382/282 |
| 2003/0026474 A1* | 2/2003 | Yano .............................. 382/154 |
| 2008/0158346 A1 | 7/2008 | Okamoto et al. |
| 2010/0283833 A1* | 11/2010 | Yeh ................................. 348/46 |

FOREIGN PATENT DOCUMENTS

| JP | 9-191393 | 7/1997 |
| JP | 2006-33228 | 2/2006 |
| JP | 2008-167066 | 7/2008 |
| JP | 2008-172342 | 7/2008 |
| JP | 4442190 | 3/2010 |

OTHER PUBLICATIONS

JP Office Action dated Feb. 19, 2013, with partial English translation; Application No. 2011-055498.

* cited by examiner

*Primary Examiner* — Sath V Perungavoor
*Assistant Examiner* — Janese Duley
(74) *Attorney, Agent, or Firm* — Young & Thompson

(57) ABSTRACT

An imaging apparatus is adapted to shoot a subject at two or more different viewpoints to obtain a right viewpoint image and a left viewpoint image, or multi-viewpoint images, with parallax that are to be merged together into a 3D image. The apparatus includes a monitor for displaying the image to be taken upon shooting; an input device for inputting an indispensable output area which an user wants to be included in the 3D image outputted; and a control unit for causing the indispensable output area and an area out of mergence, which is unable to be included in the 3D image in accordance with the amount of parallax between the right viewpoint image and the left viewpoint image, or between the multi-viewpoint images, to be merged together into the 3D image, to be indicated in the image to be taken.

16 Claims, 10 Drawing Sheets

FIG. 10A
FIG. 10B
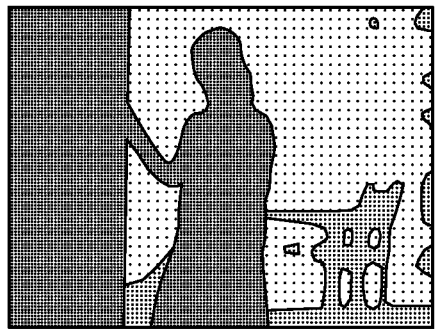
FIG. 11A
FIG. 11B
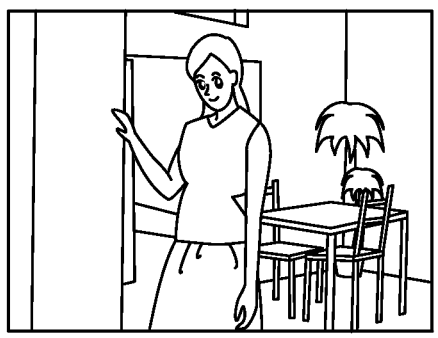
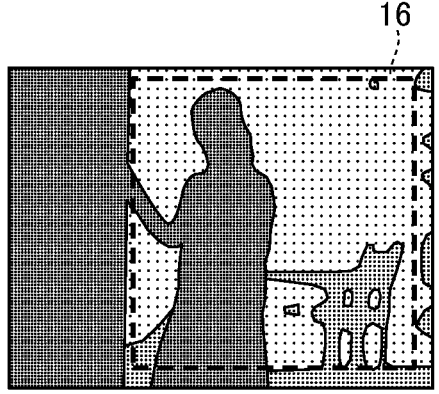

IMAGING APPARATUS, IMAGING METHOD AND IMAGING SYSTEM

BACKGROUND OF THE INVENTION

The present invention relates imaging apparatus and imaging methods for shooting a subject at two or more different viewpoints to obtain a right viewpoint image and a left viewpoint image, or multi-viewpoint images, with parallax that are to be merged together into a 3D image, as well as imaging systems.

It is known that a human being perceives the third dimension of an object by viewing the object with his/her right and left eyes at different angles and distances. The difference in appearance of the object as viewed with the right and left eyes is referred to as parallax, and the magnitude of the parallax is referred to as the amount of parallax (amount of vision disparity).

Up until today proposed were methods of exploiting the principle of third dimension perception by human beings to make people recognize two 2D images with parallax as a stereo image (3D image). As an example: If one and the same subject is shot at different angles from two viewpoints positioned right and left, respectively, to obtain a right viewpoint image and a left viewpoint image with parallax, and the right viewpoint image is presented to the right eye of a person, while the left viewpoint image is presented to the left eye, the person recognizes the two 2D images as one 3D image.

Since the third dimension perception by human beings is according to the magnitude of the parallax, a stereoscopic impression (or, the depth) of a 3D image can be modified by displacing right and left viewpoint images physically in horizontal directions to adjust the amount of parallax.

The amount of parallax is known to depend on the size of the 3D image to be displayed, a larger size increasing the amount of parallax between a right viewpoint image and a left viewpoint image, and the 3D image depth as well. It is also known that a 3D image is presented as a superposition of a right viewpoint image and a left viewpoint image, and the superposition, that is to say, a portion displayable as a 3D image varies in range with the amount of parallax.

In the case of human beings, the distance between the right and left eyes (interpupillary distance) is about 65 mm on average, and such a distance is considered optimal as the distance between lenses for the conventional 3D shooting. In contrast, the assignee of the present application, FUJIFILM Corporation, shows on its website, page of "3D Digital Image Systems" (http://fujifilm.jp/personal/3d/index.html; accessed by the present inventors on Jan. 20, 2011) the stereoscopic camera (3D digital camera) in which the distance between two lenses used for taking right and left viewpoint images, respectively, is increased from the conventional one by ca. 20%. The camera as such somewhat enhances the 3D image depth in comparison with the third dimension of the subject that is perceived by human eyes. In addition, the stereoscopic camera as shown on the website has a parallax adjusting function capable of being toggled between automatic and manual modes, which makes it possible to take and appreciate a natural 3D image irrespective of the distance to the subject.

It is said that human beings receive a stereoscopic impression owing to "binocular parallax" caused by the differences between the right and left eyes in viewing angle and distance. For the LCD monitor of the stereoscopic camera as above, the 3D image displaying technologies which the assignee of the present application has developed on its own, such as "Light Direction Control System" and "Parallax Barrier System," are employed. By the technologies, lights entering into the right and left eyes, respectively, are controlled in direction with high precision to project different images onto the two eyes, and thereby allow a natural, stereoscopic impression to be received with the naked eye.

The patent documents as mentioned below are prior art documents related to the present invention.

JP 4442190 B describes that a marginal region is provided on each of the right and left sides of a right viewpoint image, and an image for stereopsis is appropriately produced, with no areas thereof being made undisplayable, even if the right viewpoint image or a left viewpoint image is slid.

JP 2008-172342 A describes that a specified pattern is detected from a plurality of images for 3D display, the coordinates of the detected patterns are detected, the amount of parallax is calculated based on the coordinates of the patterns in the first and second images, which are two different images for 3D display out of the images for 3D display as above, and the pixel numbers of the two images, and a combination of first and second images corresponding to an amount of parallax suitable for stereopsis is determined based on the amount of parallax as calculated.

JP 2006-33228 A describes that an image for the left eye and an image for the right eye, both displayed on a display means, are subjected to trimming, with identical areas thereof being trimmed off, and the images are then merged together into a three-dimensional image, which is zoomed and displayed on the display means.

JP 2008-167066 A describes that, upon display of the whole image, a marking for indicating the range of the real images at right and left viewpoints in the whole image or for indicating the range of the stereoscopic image in the whole image is also displayed.

JP 9-191393 A describes that, during the production of an image for stereopsis from two-dimensional images, the entire original may not be recorded on a sheet of recording paper due to the relationship among the sizes of the original and the sheet of paper, the scaling factor, and the amount of displacement, and, in that case, the event is made known on a display.

During photo printing of a 3D image taken with a stereoscopic camera, a printing order is received through an order receiving apparatus (shopfront order receptor) placed in an agency dealing with photo printing of 3D images, a webpage on the Internet or the like, and image data (3D image data) on the 3D image, order information, and so forth are sent to a laboratory for photo printing of 3D images. In the laboratory, the amount of parallax between a right viewpoint image and a left viewpoint image is manually adjusted by an operator to make the photo print in which the depth of the 3D image is modified.

When a 3D image is synthesized from a right viewpoint image and a left viewpoint image, the two viewpoint images are physically shifted in horizontal directions to adjust the amount of parallax and thereby modify the depth of the 3D image, as mentioned before. Since a 3D image is limited to a superposition of a right viewpoint image and a left viewpoint image, there may arise a problem with photo printing of a 3D image, that is to say, a photo print actually received by a user may differ from that expected by the user in printed area depending on the degree of parallax adjustment.

SUMMARY OF THE INVENTION

It is an object of the present invention to provide an imaging apparatus and an imaging method each allowing synthesis of a 3D image never missing the area whose output is expected by a user, as well as an imaging system involving such an apparatus or method.

In order to achieve the above object, the present invention provides an imaging apparatus for shooting a subject at two or more different viewpoints to obtain a right viewpoint image and a left viewpoint image, or multi-viewpoint images, with parallax that are to be merged together into a 3D image, comprising:

a monitor for displaying an image to be taken upon shooting;

an input device for inputting an indispensable output area specified by a user referring to the image to be taken as displayed on the monitor, with the area being wanted by the user to be included in the 3D image outputted; and a control unit for causing the indispensable output area and an area out of mergence, which is unable to be included in the 3D image in accordance with an amount of parallax between the right viewpoint image and the left viewpoint image, or between the multi-viewpoint images, to be merged together into the 3D image, to be indicated in the image to be taken.

Preferably, if said indispensable output area and said area out of mergence overlap, said control unit performs automatic zooming for scaling down said image to be taken and the indispensable output area concurrently until the indispensable output area and the area out of mergence do not overlap any more.

Preferably, further comprising a face detector for detecting a human face area in said image to be taken, wherein:

said control unit selects the human face area as said indispensable output area, and performs said automatic zooming.

Preferably, if said indispensable output area and said area out of mergence do not overlap, and zooming for scaling up said image to be taken is performed in accordance with instructions inputted through said input device, said control unit scales up the image to be taken and the indispensable output area concurrently in such a range that the indispensable output area and the area out of mergence do not overlap.

Preferably, said control unit warns if said image to be taken is going to be scaled up to such a range that said indispensable output area and said area out of mergence overlap.

Preferably, if said indispensable output area and said area out of mergence overlap, said control unit warns to displace the imaging apparatus left or right until the indispensable output area and the area out of mergence do not overlap any more.

Preferably, further comprising a parallax amount checker for checking whether or not said indispensable output area is suitable for stereopsis in terms of the amount of parallax, wherein:

if checking results show that the indispensable output area is not suitable for stereopsis in terms of the amount of parallax, said control unit warns to approach said subject until the indispensable output area becomes suitable for stereopsis in terms of the amount of parallax at a specified distance.

Preferably, further comprising a face detector for detecting a human face area in said image to be taken, wherein:

said control unit calculates a shooting distance to a person whose face is contained in the human face area from a size of the person's face in the human face area, and warns to approach the person until the shooting distance to the person is reduced to a specified distance if the shooting distance is longer than the specified distance.

Preferably, said face detector detects a human face area in said indispensable output area; and said control unit calculates a shooting distance to a person contained in the indispensable output area.

Preferably, said control unit selects an area in said image to be taken that contains a person as said indispensable output area based on a location of the person and the shooting distance to the person, and causes the selected area to be indicated in the image to be taken.

Preferably, further comprising a parallax map generator for generating a parallax map from said right viewpoint image and left viewpoint image, or multi-viewpoint images, with the map expressing parallaxes between corresponding pixels of the right viewpoint image and left viewpoint image, or multi-viewpoint images, wherein:

said control unit causes the parallax map to be displayed on said monitor in pseudocolor or gray scale in accordance with the parallaxes, detects a person contained in said image to be taken on a basis of said human face area, selects an area in the image to be taken that contains the person as said indispensable output area, and causes the selected area to be indicated in the parallax map as displayed on the monitor.

Preferably, if a shooting distance to a specified contained in said image to be taken is longer than a specified distance, and zooming in of the subject is performed, said control unit warns to approach the subject and, at a same time, performs automatic zooming for scaling down the subject, which should be scaled up as the shooting distance is reduced, until the shooting distance is reduced to the specified distance or shorter.

Preferably, if a shooting distance to a subject contained in said image to be taken is not longer than a specified distance, said control unit performs said automatic zooming.

Also, the present invention provides an imaging system, comprising first and second imaging apparatus which are each the imaging apparatus according to claim 1, wherein:

the first imaging apparatus further comprises an output device for outputting said right viewpoint image and left viewpoint image, or multi-viewpoint images, and information on said indispensable output area;

the second imaging apparatus further comprises a reception device for receiving the right viewpoint image and left viewpoint image, or multi-viewpoint images, and the information on the indispensable output area; and the reception device of the second imaging apparatus receives the right viewpoint image and left viewpoint image, or multi-viewpoint images, and the information on the indispensable output area as outputted from the first imaging apparatus.

Preferably, the control unit of said second imaging apparatus causes the indispensable output area as received from said first imaging apparatus to be indicated in the image to be taken as displayed on the monitor of the second imaging apparatus.

Also, the present invention provides an imaging method for shooting a subject at two or more different viewpoints to obtain a right viewpoint image and a left viewpoint image, or multi-viewpoint images, with parallax that are to be merged together into a 3D image, comprising:

displaying an image to be taken upon shooting on a monitor;

inputting, through an input device, an indispensable output area specified by a user referring to the image to be taken as displayed on the monitor, which the user wants to be included in the 3D image outputted; and causing, by a control unit, the indispensable output area and an area out of mergence, which is unable to be included in the 3D image in accordance with an amount of parallax between the right viewpoint image and the left viewpoint image, or between the multi-viewpoint images, to be merged together into the 3D image, to be indicated in the image to be taken.

Also, the present invention provides an imaging method applicable to an imaging system comprising first and second imaging apparatus which are each the imaging apparatus according to claim 1, with the first imaging apparatus further comprising an output device for outputting said right viewpoint image and left viewpoint image, or multi-viewpoint images, and information on said indispensable output area, and the second imaging apparatus further comprising a reception device for receiving the right viewpoint image and left viewpoint image, or multi-viewpoint images, and information on the indispensable output area, wherein:

the reception device of the second imaging apparatus receives the right viewpoint image and left viewpoint image, or multi-viewpoint images, and the information on the indispensable output area as outputted from the first imaging apparatus.

According to the present invention, the amount of parallax is adjusted using the indispensable output area which is so specified by a user as not to overlap an area out of mergence. Consequently, a 3D image never missing the area whose output is expected by the user is synthesized.

BRIEF DESCRIPTION OF THE DRAWINGS

In the accompanying drawings:

FIGS. 10A and 10B are schematic diagrams showing an exemplary image to be taken and its parallax map, respectively;

FIGS. 11A and 11B are schematic diagrams illustrating the case where an indispensable print area is automatically indicated in the parallax map of the image to be taken;

FIG. 12 is a schematic diagram illustrating the cases where a person nearby is shot without zooming in, and where a person in the distance is shot with zooming in.

DETAILED DESCRIPTION OF THE INVENTION

In the following, the imaging apparatus and the imaging method as well as the imaging system according to the present invention are detailed in reference to the preferred embodiments as shown in the accompanying drawings. The inventive imaging apparatus may be embodied in a digital camera, and the following description is made based on the digital camera as an example.

Figure 1:
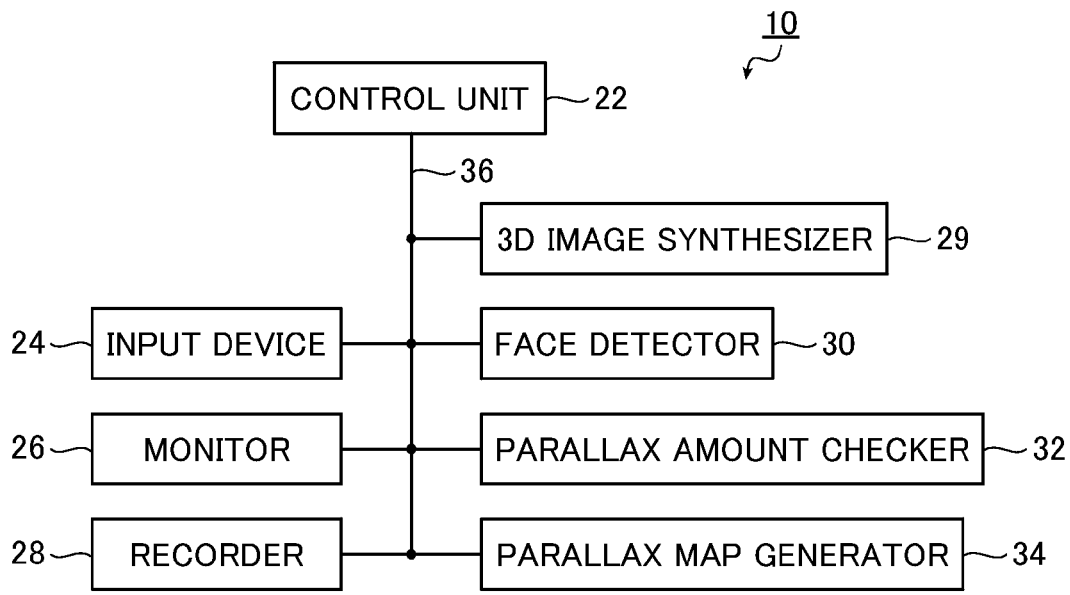
FIG. 1 is a block diagram of an embodiment of the digital camera according to the present invention, representing the inner structure thereof.

FIG. 1 is a block diagram of an embodiment of the digital camera according to the present invention, representing the inner structure thereof. A digital camera 10 shown in the figure is adapted to shoot a subject at two different viewpoints, namely right and left viewpoints, to obtain the right viewpoint image and the left viewpoint image with parallax that are to be merged together into a 3D image so as to make a photo print. The digital camera 10 is comprised of a control unit 22, an input device 24, a monitor 26, a recorder 28, a 3D image synthesizer 29, a face detector 30, a parallax amount checker 32, and a parallax map generator 34.

Synthesis of a 3D image does not necessarily need to be carried out by merging right and left viewpoint images together. Multi-viewpoint images obtained by shooting a subject at a plurality of (that is to say, three or more) different viewpoints may be merged together into a 3D image.

The control unit 22 controls operations of the digital camera 10 as a whole, that is to say, controls the operations of the input device 24, the monitor 26, the recorder 28, the 3D image synthesizer 29, the face detector 30, the parallax amount checker 32, and the parallax map generator 34 as described later. The control unit 22, the input device 24, the monitor 26, the recorder 28, the 3D image synthesizer 29, the face detector 30, the parallax amount checker 32, and the parallax map generator 34 are connected with one another through a signal line 36.

Figure 2:
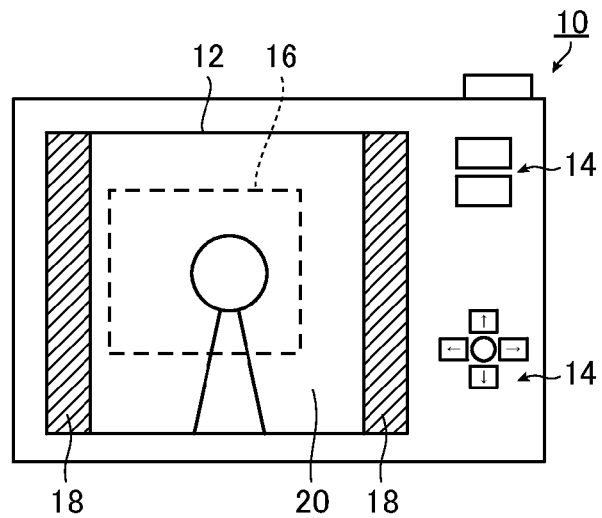
FIG. 2 is a schematic diagram showing the back face of an embodiment of the digital camera according to the present invention.

FIG. 2 is a schematic diagram showing the back face of an embodiment of the digital camera according to the present invention. As shown in the figure, a digital camera 10 of this embodiment is provided on its back face with a finder 12 and operating buttons 14.

The finder 12 is a monitor, an LCD monitor for instance, for displaying an image (hereafter referred to as "the image to be taken") upon shooting. On the finder 12, a 2D image (e.g., a right viewpoint image, a left viewpoint image, one out of multi-viewpoint images, or a parallax map described later) or a 3D image (stereo image) synthesized by the 3D image synthesizer 29 from right and left viewpoint images may selectively be displayed. In addition, the finder 12 serves as a touch panel (the input device 24) allowing a user (person using the digital camera 10) referring to the image to be taken as displayed on the finder 12 to specify the indispensable print area 16 which the user wants to be indispensably reproduced in a photo print (the indispensable output area which the user wants to be included in a 3D image outputted) by sliding a fingertip on a display screen.

The operating buttons 14 constitute the input device 24 with which a user makes various settings for, and gives various instructions to, the digital camera 10.

The indispensable print area 16 may be in the shape of a rectangle with any aspect ratio or a circle. During shooting, an indispensable print area may be specified at least at its horizontal ends, although it needs to be specified not only at its horizontal, but vertical ends if a photo print is ordered. The finder 12 as a touch panel allows a user referring to the image as displayed on the display screen to specify the indispensable print area 16 by sliding a fingertip on the display screen of the finder 12. If the finder 12 is not a touch panel, the indispensable print area 16 can be specified using the operating buttons 14.

The user who takes an image in accordance with the imaging method of the present invention acts as follows.

During image taking, a 3D image (stereo image), for instance, is displayed on the finder 12 as the image to be taken. Under control of the control unit 22, areas out of mergence 18 are indicated in horizontal end portions of the displayed image in a superimposed manner as shown in FIG. 2. The areas out of mergence 18 are areas unable to be reproduced in a photo print of the 3D image in accordance with the amount of parallax between the right and left viewpoint images (or between the multi-viewpoint images) to be merged together into a 3D image.

The user, as viewing the image to be taken as displayed on the finder 12, determines the composition of the image, and specifies the indispensable print area 16 in a rectangular shape as shown in FIG. 2 with dotted lines by sliding a fingertip on the display screen of the finder 12 serving as a touch panel, for instance. The indispensable print area 16 thus specified is indicated in the displayed image in a superimposed manner under control of the control unit 22. The user is capable of specifying the indispensable print area 16 within a mergeable area 20 other than the areas out of mergence 18 by referring to the areas 18 as indicated in the horizontal end portions of the image to be taken.

After specifying the indispensable print area 16, the user presses the shutter to take the image as displayed on the finder 2, so that image data on right and left viewpoint images (or multi-viewpoint images) corresponding to the taken image are captured. The image data on the right and left viewpoint images (or multi-viewpoint images) and information on the indispensable print area 16 for the viewpoint images are associated with each other so as to store them in a recording medium such as a memory card installed in the recorder 28 of the digital camera 10.

If photo printing of a 3D image is to be conducted, image data on right and left viewpoint images (or multi-viewpoint images) and information on the indispensable print area 16 for the viewpoint images, both stored in the recording medium, are associated with each other, then sent sequentially to a laboratory for synthesis and photo printing of 3D images from an order receiving apparatus placed in an agency dealing with photo printing of 3D images, a webpage on the Internet or the like via telecommunications lines such as the Internet.

Image data on right and left viewpoint images or multi-viewpoint images and information on an indispensable print area for the viewpoint images are not limited to being sent to a laboratory from an order receiving apparatus via telecommunications lines. The recording medium in which the data and information are stored may be delivered to the laboratory so as to read the data and information from the medium in the laboratory. In other words, nothing is required of an order receiving apparatus but to output image data on right and left viewpoint images or multi-viewpoint images and information on an indispensable print area for the viewpoint images to the outside, whereupon a telecommunications means, a means for recording on a recording medium, and so forth are usable as an output means.

In the laboratory, an operator uses the information on the indispensable print area 16 to adjust the amount of parallax, namely the 3D image depth, within such a range that the indispensable print area 16 is indispensably included in a 3D image synthesized, so as to synthesize a 3D image from the image data on the right and left viewpoint images (or multi-viewpoint images) and make a photo print of the 3D image.

A 3D image does not necessarily need to be synthesized in the laboratory from the image data on the right and left viewpoint images or multi-viewpoint images and the information on the indispensable print area for the viewpoint images. It is also possible to transmit the data and information to a personal computer having a function of synthesizing a 3D image from them, so as to synthesize a 3D image on the computer and output a print from a printer.

The digital camera 10 of this embodiment allows the amount of parallax to be adjusted in the laboratory using the indispensable print area 16 as specified by a user so that it may not overlap the areas out of mergence 18, and, accordingly, allows synthesis of a 3D image indispensably including the area which is expected by the user to be printed, and photo printing of the image.

While the range of shooting cannot be changed on order receiving apparatus involved in the taken images, it can be changed on the digital camera 10 involved in the images to be taken, in accordance with the indispensable print area 16 as specified. Owing to this advantage, a photo print of the 3D image as expected by the user can be obtained more easily with the digital camera 10. The following description is made on this point.

Figure 3A:
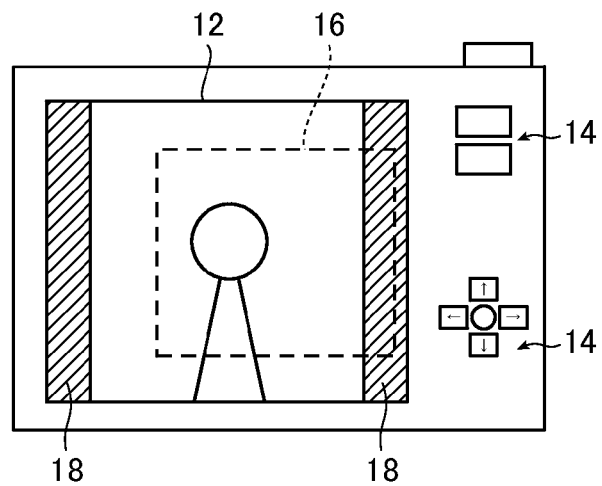
FIGS. 3A and 3B are schematic diagrams illustrating an example of the measures to be taken against the overlap between an indispensable print area and an area out of mergence.
Figure 3B:
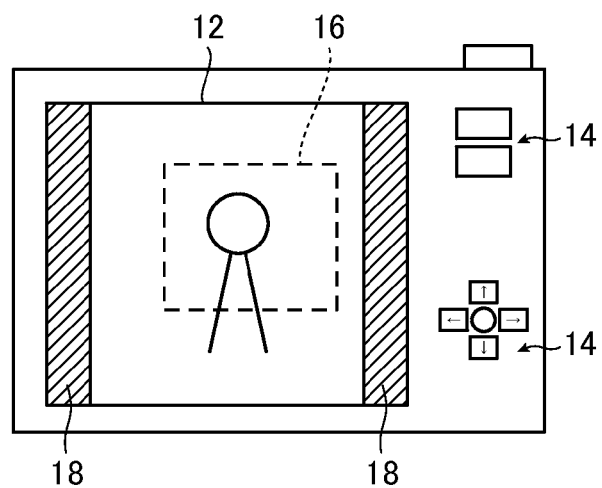

It is assumed that, as shown in FIG. 3A, the image to be taken is displayed on the finder 12 of the digital camera 10, with the areas out of mergence 18 being indicated in the horizontal end portions of the image, and the indispensable print area 16 is so specified by a user as to overlap one area out of mergence 18. The portion of the indispensable print area 16 that is superimposed on the area out of mergence 18 is unable to be reproduced in a photo print of a 3D image.

In that case, automatic zooming (automatic scaling down) is performed on the displayed image under control of the control unit 22 of the digital camera 10 until the indispensable print area 16 and the area out of mergence 18 do not overlap any more. Since the indispensable print area 16 is also scaled down as the image to be taken is scaled down by the automatic zooming as shown in 3B, adjustment can be made automatically so that the indispensable print 16 and the area out of mergence 18 may not overlap.

The automatic zooming has less effects if the shooting distance between the digital camera 10 and a subject is longer than a specified distance suitable for stereopsis. It is therefore desirable that the above zooming is performed if the shooting distance is not longer than the specified distance.

Figure 4A:
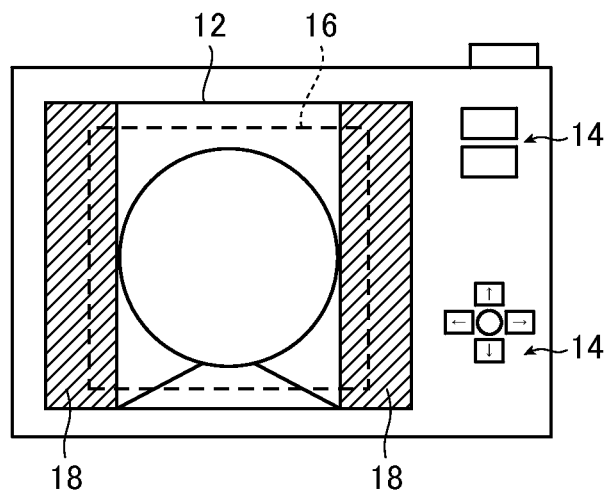
FIGS. 4A and 4B are schematic diagrams illustrating an example of the measures to be taken against the overlap between an indispensable print area and an area out of mergence if a human face area has automatically been selected as the indispensable print area.
Figure 4B:
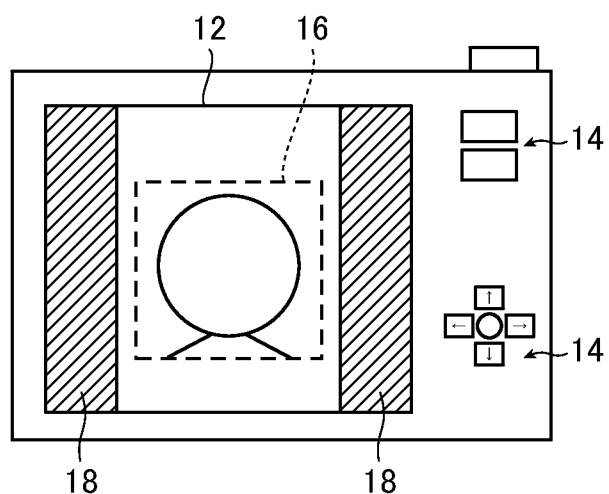

A human face area detected in the image to be taken by the face detector 30 may automatically be selected as the indispensable print area 16 (initially selected) and displayed by the control unit 22. In that case, if the indispensable print area 16 as automatically selected and the areas out of mergence 18 overlap as shown in FIG. 4A, it is desirable that the automatic zooming is similarly performed to make adjustment so that the areas 16 and 18 may not overlap as shown in FIG. 4B.

If the indispensable print area 16 overlaps neither area out of mergence 18, and zooming for scaling up the image to be taken is to be performed according to the instructions as inputted through the input device 24, the range of the zooming may be limited.

Figure 5A:
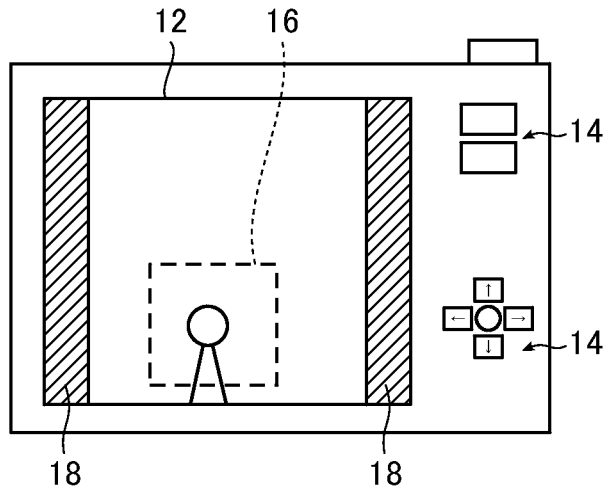
FIGS. 5A and 5B are schematic diagrams illustrating the case where zooming for scaling up the image to be taken is performed, and the range of the zooming is limited within a mergeable area.
Figure 5B:
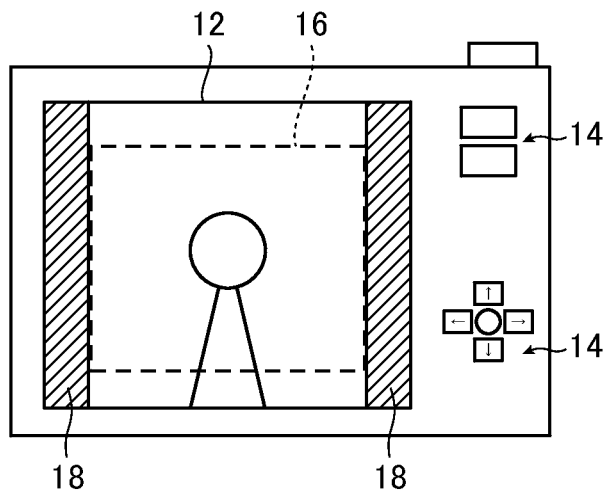

Zooming (scaling up) of the image to be taken results in a concurrent scaling up of the indispensable print area 16 which has bee specified in the mergeable area 20 as shown in FIG. 5A. This zooming is limited so that the image to be taken and the indispensable print area 16 may be scaled up concurrently in such a range that the indispensable print area 16 and the areas out of mergence 18 do not overlap, that is to say, so that the indispensable print area 16 may be scaled up within the mergeable area 20, as shown in FIG. 5B. In addition, the control unit 22 warns (through a warning message displayed, an audible alarm or the like) if a user is going to scale up the image to be taken to such an extent that the indispensable print area 16 and the areas out of mergence 18 overlap.

In the case where the shooting distance is not longer than a specified distance, and the indispensable print area 16 has been so specified as to overlap the areas out of mergence 18, it may be warned to displace the digital camera 10 right or left until the areas 16 and 18 do not overlap any more.

Figure 6A:
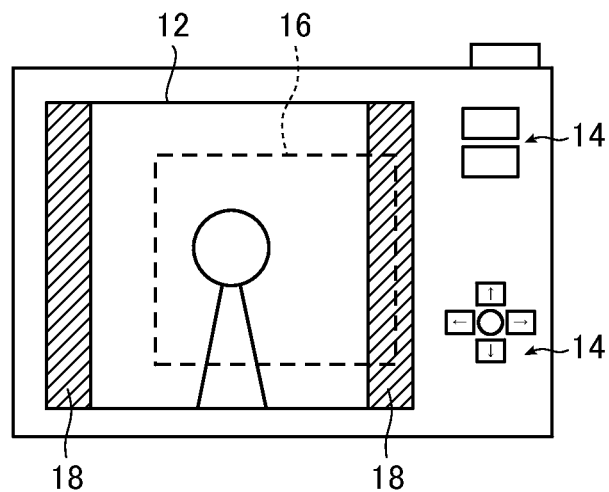
FIGS. 6A, 6B, and 6C are schematic diagrams illustrating the case where an indispensable print area and an area out of mergence overlap, and it is warned to displace a digital camera right until the two areas do not overlap any more.
Figure 6B:
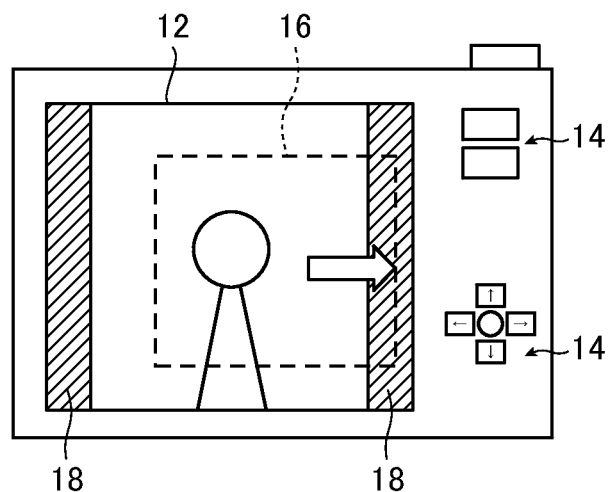
Figure 6C:
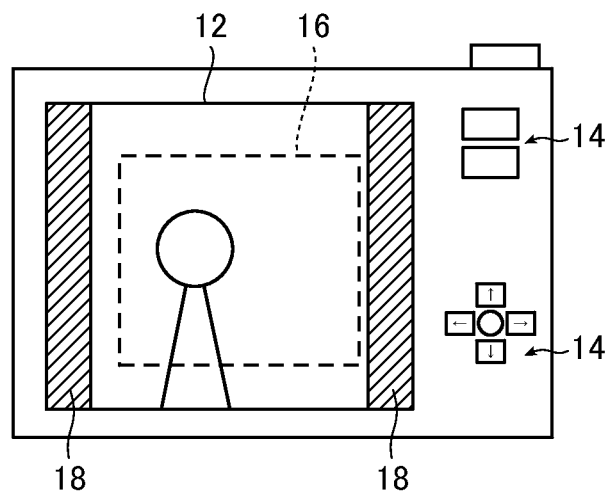

If the indispensable print area 16 overlaps the area out of mergence 18 in the right end portion of the image to be taken as shown in FIG. 6A, for instance, it is warned to displace the digital camera 10 right, as shown in FIG. 6B with a rightward arrow. With the digital camera 10 being displaced right, the image to be taken and the indispensable print area 16 are concurrently moved left as shown in FIG. 6C and, accordingly, adjustment is made so that the indispensable print area 16 and the area out of mergence 18 may not overlap. After the digital camera 10 takes the position where the areas 16 and 18 do not overlap any more, the warning is terminated.

The depth of a 3D image is also related with the shooting distance. In other words, a shorter shooting distance makes the amount of parallax and the 3D image depth as well larger. It is thus desirable that the shooting distance is also taken into consideration.

Figure 7A:
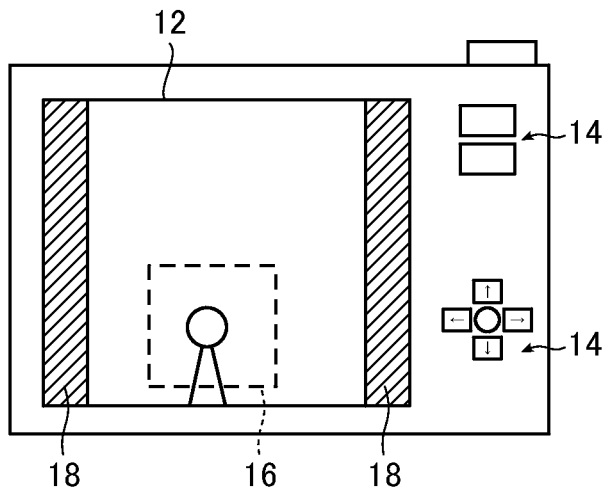
FIGS. 7A and 7B are schematic diagrams illustrating the case where the shooting distance is not suitable for stereopsis, and it is warned to approach the person to be shot until the shooting distance is reduced to a specified distance.
Figure 7B:
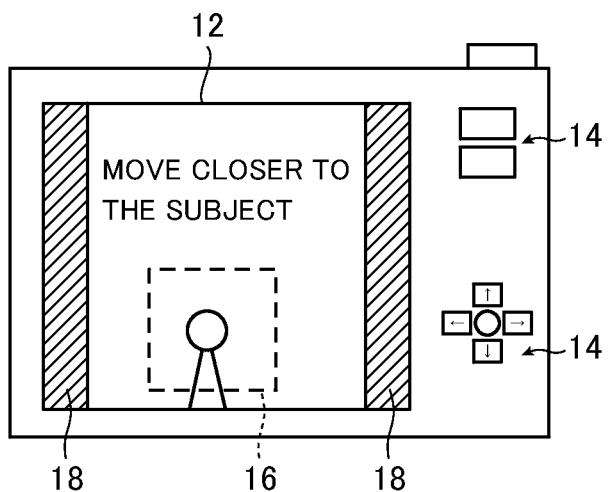

If the indispensable print area 16 is specified as shown in FIG. 7A, it is checked in the parallax amount checker 32 whether or not the indispensable print area 16 is suitable for stereopsis in terms of the amount of parallax by calculating the amount of parallax for a specified pattern (e.g., face) in two images, as disclosed in JP 2008-172342 A, for instance. If the checking results show that the indispensable print area 16 is not suitable for stereopsis in terms of the amount of parallax, it is warned by the control unit 22 to approach the subject until the indispensable print area 16 becomes suitable for stereopsis in terms of the amount of parallax at a specified distance, through the message "move closer to the subject" as shown in FIG. 7B.

It may not be necessary to strictly determine whether or not an indispensable print area is suitable for stereopsis in terms of the amount of parallax. It is also possible, for instance, that a human face area is detected by the face detector 30 in the image to be taken, the shooting distance to the person whose face is contained in the human face area as detected is calculated from the size of the face, and it is warned to approach the person until the shooting distance to the person is reduced to a specified distance if the shooting distance as calculated is longer than the specified distance.

In the case where two or more people are contained in the same scene to be shot (image to be taken), each person may be determined whether or not to be suitable for stereopsis by calculating the shooting distance to the relevant person based on the human face area included in the indispensable print area 16 that contains the person's face.

Figure 8A:
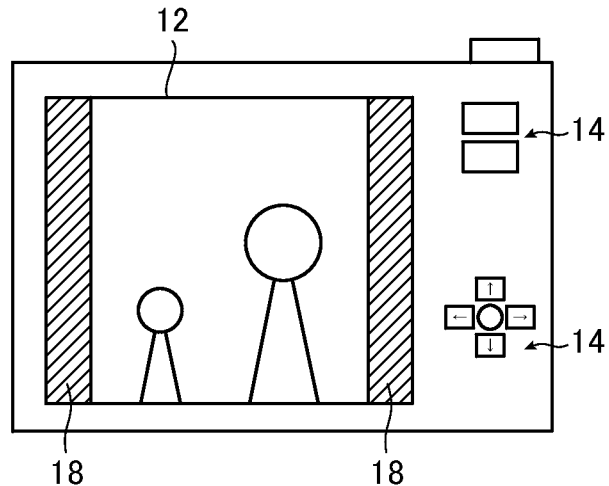
FIGS. 8A, 8B, and 8C are schematic diagrams illustrating the case where two or more people contained in an indispensable print area of the same scene to be shot, or, are each determined whether or not to be suitable for stereopsis.

In the example as shown in FIG. 8A, the person at the left is not suitable for stereopsis because the shooting distance is too long, while the person at the right is suitable for stereopsis because of a shorter shooting distance, even thought the two people are contained in the same scene to be shot.

Figure 8B:
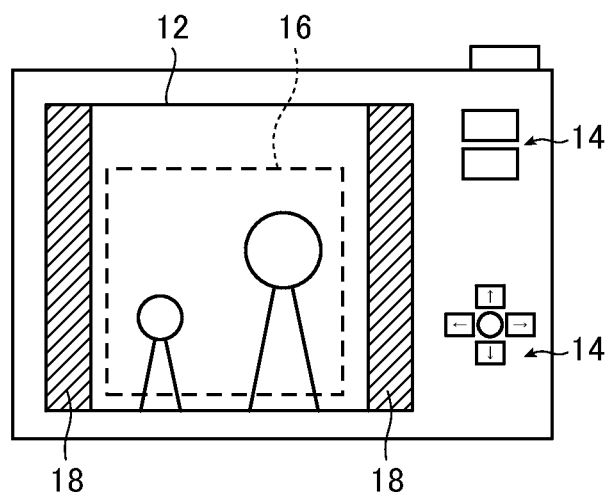
Figure 8C:
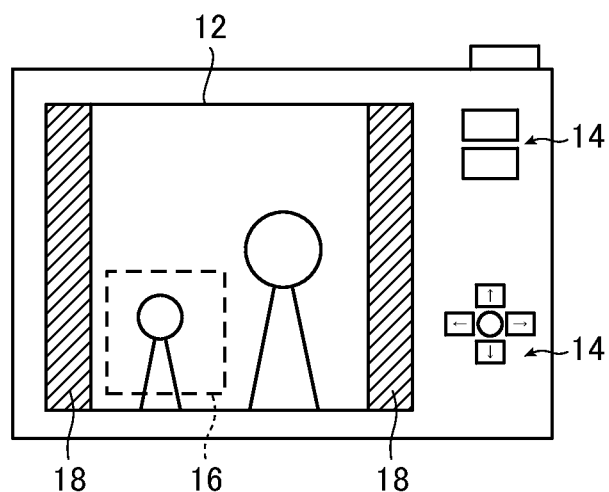

With respect to the above example, if the indispensable print area 16 is so specified as to contain both persons at the right and left as shown in FIG. 8B, no problem arises because the person at the right who is suitable for stereopsis is contained in the area 16. If the indispensable print area 16 solely contains the person at the left as shown in FIG. 8C, warning is issued because the person at the left is not suitable for stereopsis as mentioned above.

The control unit 22 may automatically select the area in the image to be taken that contains a person as an indispensable print area based on the location of the person and the shooting distance to the person, and cause the selected area to be indicated in the image to be taken.

Figure 9A:
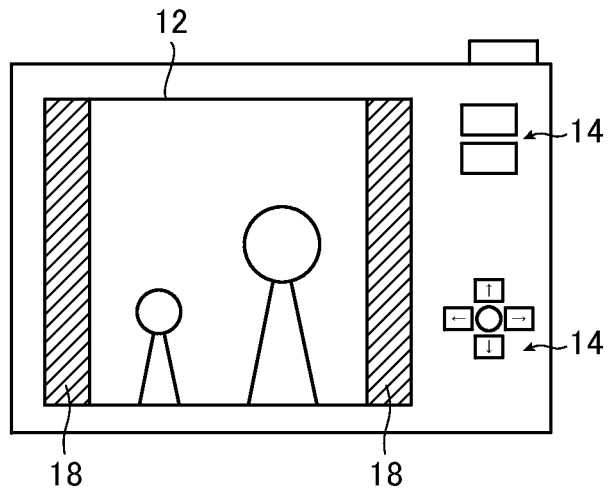
FIGS. 9A, 9B, and 9C are schematic diagrams illustrating the case where the area in the image to be taken that contains a person is automatically selected as an indispensable print area based on the location of the person and the shooting distance to the person, and is indicated in the image to be taken.
Figure 9B:
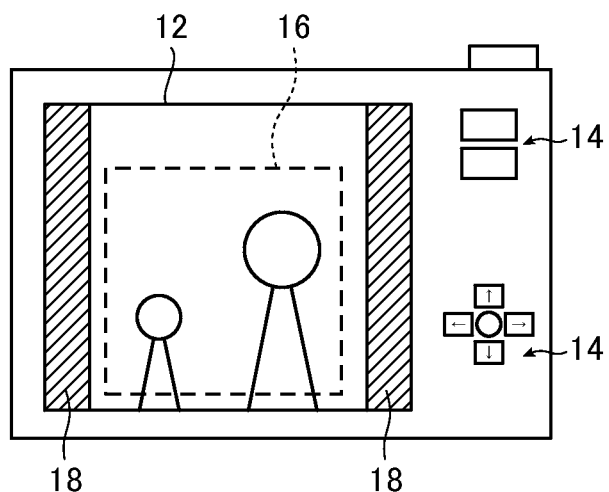
Figure 9C:
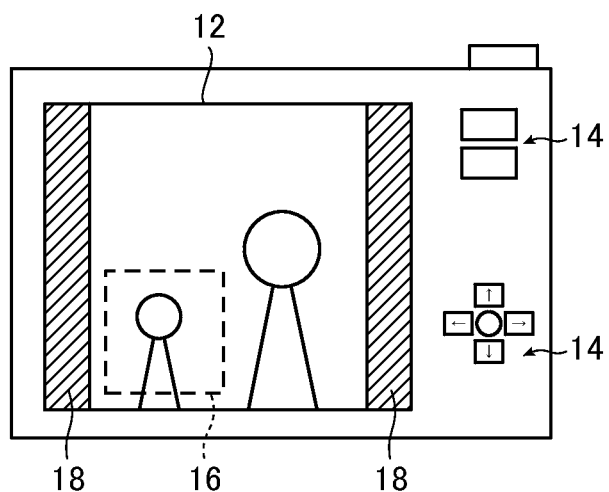

If two people are contained in the image to be taken as shown in FIG. 9A, for instance, the area which contains both people is automatically selected as the indispensable print area 16 as shown in FIG. 9B. The indispensable print area 16 thus selected automatically may be corrected by a user as appropriate, to the area solely containing the person at the left as shown in FIG. 9C, for instance.

The indispensable print area 16 may be specified using a parallax map.

FIGS. 10A and 10B are schematic diagrams showing an exemplary image to be taken and its parallax map, respectively. In the case of the image to be taken as shown in FIG. 10A, such a parallax map as shown in FIG. 10B is displayed. A parallax map is a visualization of parallaxes between corresponding pixels of a right viewpoint image and a left viewpoint image (or one multi-viewpoint image and another multi-viewpoint image), and is generated by the parallax map generator 34. The parallax map as shown is displayed in pseudocolor in accordance with parallaxes, with areas of larger parallaxes being displayed in red and areas of smaller parallaxes in blue, for instance. The parallax map may also be displayed in gray scale.

A parallax map displayed when the indispensable print area 16 is to be specified will be helpful for a user in specifying the area 16 because the parallax map allows the user to examine the 3D image depth throughout the image to be taken even if the finder 12 does not have a function of displaying 3D images.

It is also thinkable that a person contained in the image to be taken is detected by the face detector 30, then, by the control unit 22, the 3D image depth is checked throughout the image to be taken as shown in FIG. 11A based on a parallax map corresponding to the image to be taken, the area in which the 3D image depth is the largest for the person is automatically selected as the indispensable print area 16, and the selected area is indicated in the parallax map, as shown in FIG. 11B. In that case, the indispensable print are 16 as selected automatically may be corrected by a user as appropriate.

If an indispensable print area is to be automatically selected, it is desirable that the area which the 3D image depth is larger for an object other than person than for person is not selected as an indispensable print area. In the example as shown in FIGS. 11A and 11B, the leftward area of the image to be taken that contains a wall is not selected. The method of displaying a parallax map is in no way limited. The parallax map as displayed on the finder 12 may be updated in real time, or a parallax map may be displayed if the digital camera 10 has autofocused on a subject.

During display of a parallax map, the entire image to be taken may initially be transformed into a parallax map, then the parallax map may be displayed as a whole. Alternatively, the area in which a face has been detected may preferentially be displayed, while other areas may be displayed in stages, that is to say, every time one area has been transformed into a parallax map, the map may be displayed. It is also thinkable that a specified area is automatically selected as an indispensable print area in accordance with the shooting distance instead of a parallax map. Since the depth of a 3D image varies with shooting distance as described before, an area with a large 3D image depth can automatically be selected as an indispensable print area if shooting distances are found.

In the description as above, imaging control by zooming in accordance with an indispensable print area, and imaging support in accordance with the shooting distance to a subject in an indispensable print area have been discussed. Combination of both will allow a more precise control.

Figure 12:
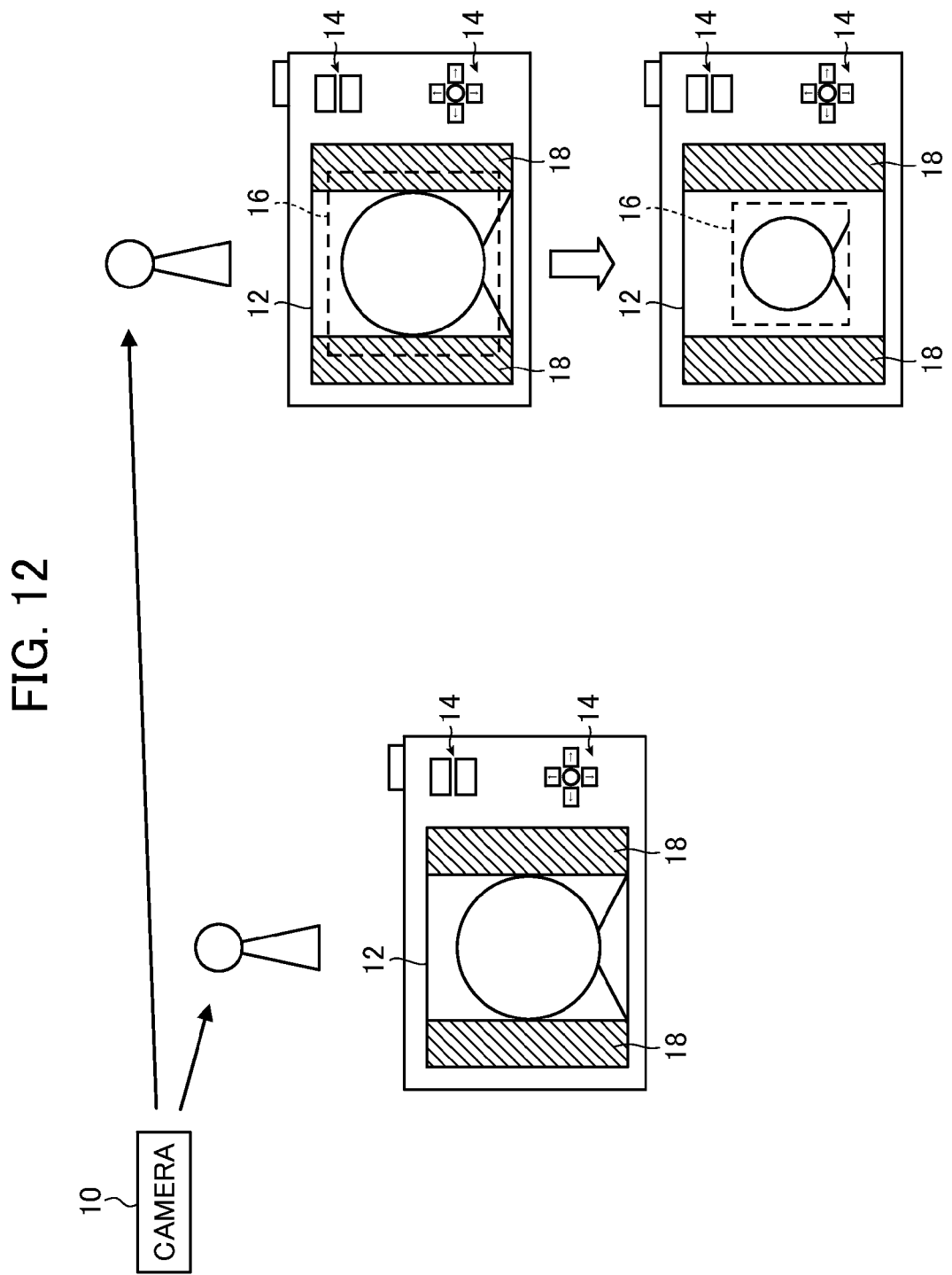

A closeup of a face, for instance, may be taken by shooting a person nearby (the person to whom the shooting distance is short) without zooming in as shown in a leftward part of FIG. 12, or by shooting a person in the distance (the person to whom the shooting distance is long) with zooming in as shown in an upper, rightward part of the figure. A 3D image is easier to synthesize if a person nearby is shot.

As mentioned before, automatic zooming (automatic scaling down) performed if the indispensable print area 16 and the areas out of mergence 18 overlap has less effects if a person in the distance is to be shot with zooming in. In that case, it is therefore desirable that a warning is initially issued to approach the subject, and the automatic zooming (automatic scaling down) is performed as shown in a lower, rightward part of FIG. 12 after the shooting distance is reduced to a specified distance (shooting distance suitable for stereopsis) or shorter.

In fact, the subject covers a larger area in the displayed image as the shooting distance is reduced, so that automatic zooming out (automatic scaling down), for instance, needs to be performed in parallel with the reduction in shooting distance in order to prevent the scaling up of the subject.

The digital camera 10 is not limited in type to a conventional photographic camera. Any apparatus having a photographing function, such as a cell phone, is available as long as it is capable of obtaining a right viewpoint image and a left viewpoint image, or multi-viewpoint images, with parallax.

Moreover, the imaging apparatus according to the present invention is not limited to digital cameras, and output of prints either. Any apparatus can be considered as the inventive imaging apparatus as long as it is capable of shooting a subject at two or more different viewpoints to obtain a right viewpoint image and a left viewpoint image, or multi-viewpoint images, receiving information on the indispensable output area which is specified by a user referring to the image to be taken upon shooting as displayed on a monitor, with the area being wanted by the user to be included in a 3D image outputted, and causing the indispensable output area and areas out of mergence to be indicated in the image to be taken in a superimposed manner.

Similarly, the imaging system according to the present invention as a combination of two or more imaging apparatus of the invention, is not limited to digital cameras, and output of prints either. If the imaging system includes first and second imaging apparatus, for instance, the first imaging apparatus has an output device for outputting right and left viewpoint images, or multi-viewpoint images, and information on an indispensable output area, while the second imaging apparatus has a reception device adapted to the output device. The right and left viewpoint images, or multi-viewpoint images, and the information on an indispensable print area as outputted from the output device of the first imaging apparatus are received by the reception device of the second imaging apparatus, which allows the two imaging apparatus to share these data.

Such data sharing among a plurality of imaging apparatus makes it possible to utilize the contents of the processing as performed in one imaging apparatus for the processing to be performed in another imaging apparatus, that is to say, allows each user to utilize the contents of the processing as performed by any other user for the processing to be performed by the relevant user. As an example, the indispensable output area as received from a first imaging apparatus may be caused by a control unit of a second imaging apparatus to be indicated in the image to be taken as displayed on a monitor of the second imaging apparatus.

Figure 13A:
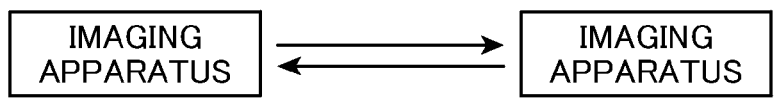
FIGS. 13A and 13B are each a block diagram of an embodiment of the imaging system according to the present invention, representing the structure thereof.
Figure 13B:
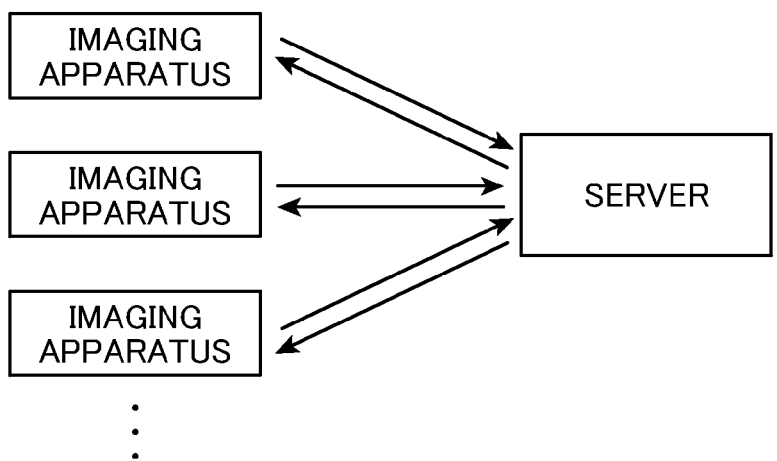

In the case where an imaging system includes two imaging apparatus, the apparatus may share data by transceiving the data through a cable connecting them directly with each other as shown in FIG. 13A, or by the input/output of the data using a recording medium. If the imaging system includes three or more imaging apparatus, data sharing may be carried out by providing a server for storing data, which is made accessible to the individual imaging apparatus via telecommunications lines for data transception.

The present invention is essentially as described above.

The present invention is not limited to the embodiments as detailed above and, as a matter of course, various improvements and modifications may be made within the scope of the present invention.

What is claimed is:

1. An imaging apparatus for shooting a subject at two or more different viewpoints to obtain a right viewpoint image and a left viewpoint image, or multi-viewpoint images, with parallax that are to be merged together into a 3D image, comprising:

a monitor for displaying an image to be taken upon shooting;

an input processor for inputting an indispensable output area specified by a user referring to the image to be taken as displayed on the monitor, with the area being wanted by the user to be included in the 3D image outputted; and a control processor for causing said monitor to display i) a mergeable area where the left and right viewpoint images can be merged together into a 3D image, ii) an adjacent area out of mergence where the left and right viewpoint images cannot be merged together into the 3D image due to an amount of parallax between the right viewpoint image and the left viewpoint image, and iii) the indispensable output area to be indicated in the image to be taken, wherein, when said indispensable output area is so specified by the user as to overlap both said mergeable area and said area out of mergence, said control processor performs automatic zooming for scaling down said image to be taken such that the zoom is reduced so that the indispensable output area is reduced on the monitor to be entirely within the mergeable area of the monitor and completely out of said area out of mergence that is unable to be included in the 3D image due to the amount of parallax between the right viewpoint image and the left viewpoint image.

2. The imaging apparatus according to claim 1, further comprising a face detection processor for detecting a human face area in said image to be taken, wherein:
said control processor selects the human face area as said indispensable output area, and performs said automatic zooming.

3. The imaging apparatus according to claim 1, wherein, if said indispensable output area and said area out of mergence do not overlap, and zooming for scaling up said image to be taken is performed in accordance with instructions inputted through said input processor, said control processor scales up the image to be taken and the indispensable output area concurrently in such a range that the indispensable output area and the area out of mergence do not overlap.

4. The imaging apparatus according to claim 3, wherein said control processor warns if said image to be taken is going to be scaled up to such a range that said indispensable output area and said area out of mergence overlap.

5. The imaging apparatus according to claim 1, wherein, if said indispensable output area and said area out of mergence overlap, said control processor warns to displace the imaging apparatus left or right until the indispensable output area and the area out of mergence do not overlap any more.

6. The imaging apparatus according to claim 5, further comprising a parallax amount check processor for checking whether or not said indispensable output area is suitable for stereopsis in terms of the amount of parallax, wherein:
if checking results show that the indispensable output area is not suitable for stereopsis in terms of the amount of parallax, said control processor warns to approach said subject until the indispensable output area becomes suitable for stereopsis in terms of the amount of parallax at a specified distance.

7. The imaging apparatus according to claim 5, further comprising a face detection processor for detecting a human face area in said image to be taken, wherein:
said control processor calculates a shooting distance to a person whose face is contained in the human face area from a size of the person's face in the human face area, and warns to approach the person until the shooting distance to the person is reduced to a specified distance if the shooting distance is longer than the specified distance.

8. The imaging apparatus according to claim 7, wherein:
said face detection processor detects a human face area in said indispensable output area; and
said control processor calculates a shooting distance to a person contained in the indispensable output area.

9. The imaging apparatus according to claim 7, wherein said control processor selects an area in said image to be taken that contains a person as said indispensable output area based on a location of the person and the shooting distance to the person, and causes the selected area to be indicated in the image to be taken.

10. The imaging apparatus according to claim 7, further comprising a parallax map generation processor for generating a parallax map from said right viewpoint image and left viewpoint image, or multi-viewpoint images, with the map expressing parallaxes between corresponding pixels of the right viewpoint image and left viewpoint image, or multi-viewpoint images, wherein:
said control processor causes the parallax map to be displayed on said monitor in pseudocolor or gray scale in accordance with the parallaxes, detects a person contained in said image to be taken on a basis of said human face area, selects an area in the image to be taken that contains the person as said indispensable output area, and causes the selected area to be indicated in the parallax map as displayed on the monitor.

11. The imaging apparatus according to claim 1, wherein, if a shooting distance to a subject contained in said image to be taken is longer than a specified distance, and zooming in of the subject is performed, said control processor warns to approach the subject and, at a same time, performs automatic zooming for scaling down the subject, which should be scaled up as the shooting distance is reduced, until the shooting distance is reduced to the specified distance or shorter.

12. The imaging apparatus according to claim 1, wherein, if a shooting distance to a subject contained in said image to be taken is not longer than a specified distance, said control processor performs said automatic zooming.

13. An imaging system, comprising first and second imaging apparatus which are each the imaging apparatus according to claim 1, wherein:
the first imaging apparatus further comprises an output processor for outputting said right viewpoint image and left viewpoint image, or multi-viewpoint images, and information on said indispensable output area;
the second imaging apparatus further comprises a reception processor for receiving the right viewpoint image and left viewpoint image, or multi-viewpoint images, and the information on the indispensable output area; and
the reception processor of the second imaging apparatus receives the right viewpoint image and left viewpoint image, or multi-viewpoint images, and the information on the indispensable output area as outputted from the first imaging apparatus.

14. The imaging system according to claim 13, wherein the control processor of said second imaging apparatus causes the indispensable output area as received from said first imaging apparatus to be indicated in the image to be taken as displayed on the monitor of the second imaging apparatus.

15. An imaging method for shooting a subject at two or more different viewpoints to obtain a right viewpoint image and a left viewpoint image, or multi-viewpoint images, with parallax that are to be merged together into a 3D image, comprising:
displaying an image to be taken upon shooting on a monitor;
inputting, through an input processor, an indispensable output area specified by a user referring to the image to be taken as displayed on the monitor, which the user wants to be included in the 3D image outputted; and
causing, by a control processor, the indispensable output area and an area out of mergence, which is unable to be included in the 3D image in accordance with an amount of parallax between the right viewpoint image and the left viewpoint image, or between the multi-viewpoint images, to be merged together into the 3D image, to be indicated in the image to be taken,
wherein, when said indispensable output area is so specified by the user as to overlap into said area out of mergence, said control processor performs automatic zooming for scaling down said image to be taken such that the indispensable output area is concurrently reduced until the indispensable output area and the area out of mergence do not overlap any more.

16. The imaging method according to claim 15 further comprising,
outputting, with an output processor of a first imaging apparatus, the right viewpoint image and left viewpoint image, or multipoint images, and information on the indispensable output area, and receiving, by a reception processor of a second imaging apparatus, the right viewpoint image and left viewpoint image, or multi-viewpoint images, and the information on the indispensable output area as outputted from the first imaging apparatus.

* * * * *